July 2, 1963

K. RAAB 3,095,794

MECHANISM FOR AXIALLY DISPLACING
AN OPTICAL CAMERA COMPONENT

Filed Dec. 11, 1961

INVENTOR:
Karlheinz RAAB

BY

AGENT

July 2, 1963

K. RAAB 3,095,794

MECHANISM FOR AXIALLY DISPLACING
AN OPTICAL CAMERA COMPONENT

Filed Dec. 11, 1961

INVENTOR:
Karlheinz RAAB

BY

Karl F. Ross

AGENT

United States Patent Office 3,095,794
Patented July 2, 1963

3,095,794
MECHANISM FOR AXIALLY DISPLACING
AN OPTICAL CAMERA COMPONENT
Karlheinz Raab, Bad Kreuznach, Germany, assignor to
Jos. Schneider & Co., Optische Werke, Bad Kreuznach,
Germany, a company of Germany
Filed Dec. 11, 1961, Ser. No. 158,306
Claims priority, application Germany Dec. 15, 1960
17 Claims. (Cl. 95—45)

My present invention relates to a photographic or cinematographic camera whose objective has one or more components that are axially movable for the purpose of varying its focal length.

It has already been proposed to provide means for automatically shifting such objective components, e.g. with the aid of a reversible electric motor as more fully disclosed in commonly assigned application Ser. No. 132,029, filed August 17, 1961 by Paul Himmelsbach. It is often desirable, however, to provide means for manually changing the focal length while leaving the automatic drive inoperative.

It is, therefore, the general object of my present invention to provide means for enabling a selective switchover from manual to automatic operation, and vice versa, in the controlled displacement of one or more objective components.

It is a particular object of this invention to provide switchover means of this character controlled by the same operating member, such as a handle or a knob, that also serves for the manual displacement of the shiftable component or components.

A further object of the invention is to provide means for positively excluding interference between the manual and the automatic drive in a system of the character set forth.

In accordance with a feature of this invention I provide, in the housing of a camera objective of the type described, a rotatable control sleeve having one or more camming formations such as slots which are engaged by suitable studs on respective lens members or equivalent optical components to effect their axial displacement when the sleeve is rotated, there being further provided an actuating member such as a knob or a handle for manually rotating the sleeve and a suitable motor, e.g. of the electrical or the spring-operated type, for doing the same automatically. The actuating member can be moved along a preferably circular path, which may be considered as constituted by a succession of first positions, with entrainment of the control sleeve and can also be shifted out of that path into an alternate second position in which it is disengaged from the control sleeve while a connection is concurrently established between this sleeve and the automatic drive. This connection may be brought about by a spring coupling which could include, for example, a resilient link cammed out of engagement with a motor-driven gear by the actuating member when the latter is positioned for manual operation or a ring which is spring-urged into frictional contact with such driven gear whenever the system is set for automatic operation. Suitable means, such as conventional ball checks or releasable detents, may be provided for indexing the operating member in its decoupled or its coupled position.

The invention is described in greater detail with reference to the accompanying drawing in which.

Figure 1:
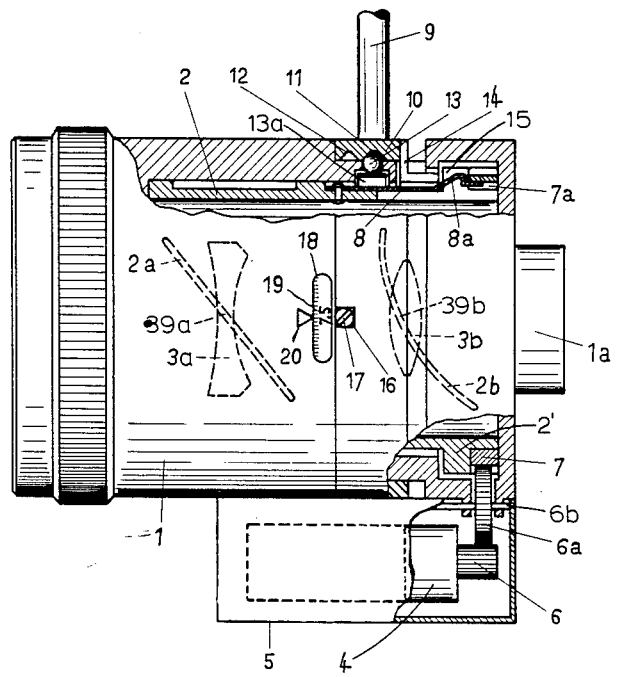
FIG. 1 is a side-elevational view (parts broken away) of a camera objective embodying the invention.
Figure 2A:
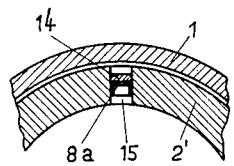
FIG. 2a is a cross-sectional view taken on line IIA—IIA of FIG. 2.
Figure 2:
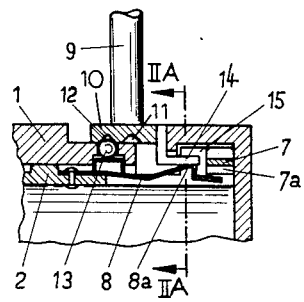
FIG. 2 is a fragmentary sectional view of the system of FIG. 1 in an alternate position of certain of its parts.

The camera objective illustrated in FIGS. 1, 2 and 2a comprises a housing 1 with a rearward extension 1a whereby it may be attached in the conventional manner to a photographic or cinematographic camera not shown. A control sleeve 2 is coaxially and rotatably mounted in housing 1 and is provided with a pair of camming slots 2a, 2b which mate with respective radial studs 39a, 39b on a pair of axially movable objective lenses 3a, 3b. The lenses 3a and 3b, which form part of an assembly whose remaining, stationary components are not shown, are held by suitable means not further illustrated against rotation within sleeve 2 and are guided for displacement along the axis thereof.

A motor 4 is disposed in a casing 5 on the exterior of housing 1 and has a pinion 6 which drives a ring gear 7 through the intermediary of a spur gear 6a provided with a shaft 6b. Ring gear 7 has a radial slot 7a which, with the system in the position illustrated in FIG. 1, is engaged by an extremity of the resilient finger 8 secured at its other end to the control sleeve 2. Thus, the rotation of gear 7 by the motor 4 is directly transmitted to the control sleeve 2 so as to cause an axial displacement of the lenses 3a, 3b at a rate determined by the slope of slots 2a, 2b.

A handle 9 projects radially outwardly from a ring 10 which is freely rotatable and axially shiftable in an external annular gap of housing 1. Ring 10 is internally provided with two axially spaced annular grooves 11, 12 which are alternately engageable by a ball 13 urged outwardly by a spring 13a. A lug 14 on ring 10 projects toward a peripheral gap 15 which is formed in an annular shoulder 2' of sleeve 2 adjacent ring gear 7. When the ring 10 and its handle 9 are in the position of FIG. 1, in which ball check 13 registers with groove 11 and which corresponds to automatic focal-length adjustment, lug 14 is withdrawn from the gap 15 and will not interfere with the rotation of sleeve 2 due to its coupling with gear 7 via link 8. In this position, furthermore, a cutout 16 on ring 10 receives the head of a setscrew 17 on housing 1 to immobilize the ring against rotation. Housing 1 is further provided with a window 18 through which a scale 19 on sleeve 2 is readable, this scale coacting with a mark 20 to indicate the focal length in each position of adjustment. It will be understood that suitable means such as limit switches may be provided, as in the system of the aforementioned Himmelsbach application, to prevent the sleeve from rotating beyond two extreme angular positions at which the studs 39a, 39b approach the ends of their camming slots 2a, 2b.

When handle 9 and ring 10 are shifted axially toward the rear as illustrated in FIG. 2, lug 14 in entering the gap 15 concurrently depresses a camming ridge 8a of spring finger 8 whereby its extremity leaves the slot 7a and decouples the sleeve 2 from gear 7. Since the cutout of ring 10 now clears the stop 17, the handle 9 is free to swing about the axis of housing 1 in order to rotate the sleeve 2 between the limits previously indicated. Ball check 13 engages the groove 12 in this manual position which has been illustrated in FIGS. 2 and 2a.

It will be noted from FIG. 2a that the camming ridge 8a near the free end of spring finger 8 remains positively guided by the sides of gap 15 in either axial position of handle 9 and ring 10.

When it is desired to restore the system to automatic operation, stop 17 is realigned with cutout 16 whereupon the ring 10 may be brought back into the position of FIG. 1 and the resilient link 8 snaps back into slot 7a whenever the same aligns itself with gap 15.

Figure 3:
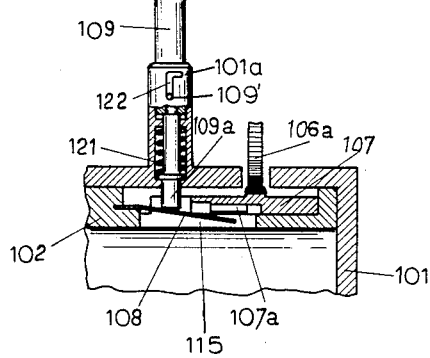
FIG. 3 is a view similar to FIG. 2, showing a modification.

In the modified system of FIG. 3 there is shown a housing 101 with a control sleeve 102, a ring gear 107 driven by a spur gear 106a, and a spring finger 108 adapted to enter a slot 107a in gear 107 to couple the latter with sleeve 102; a handle 109 rises from a socket 101a which is rigid with housing 101 and has a slot 122 in the shape of an inverted L receiving a pin 109' whereby the handle 109 may be locked against the force of a compression spring 121 in a radially withdrawn position. Spring 121 urges the handle 109 radially inwardly whereby the inner extremity 109a of the handle bears upon finger 108 to withdraw it from slot 107a, the extremity 109a at the same time disengaging a radial gap 115 of control sleeve 102 for positively coupling the handle with that sleeve.

When the handle 109 is subsequently withdrawn radially outwardly, spring finger 108 falls into the slot 107a whenever the latter, in the continued rotation of gear 107, registers with gap 115. It will be apparent that more than one slot 7a or 107a may be provided in gear 7 or 107, unless the maintenance of a definite relative angular position between the gear and the sleeve is essential to the maintenance of the proper limits for the rotation of the sleeve.

Figure 4:
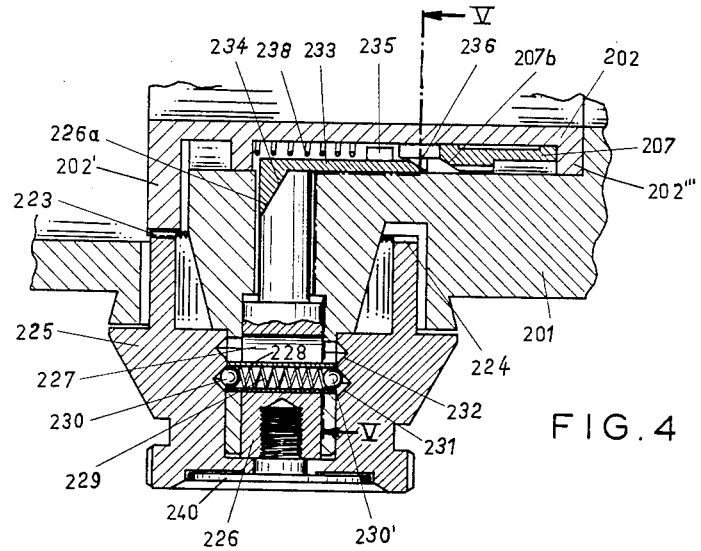
FIG. 4 is another fragmentary sectional view illustrating a further embodiment of the invention.
Figure 5:
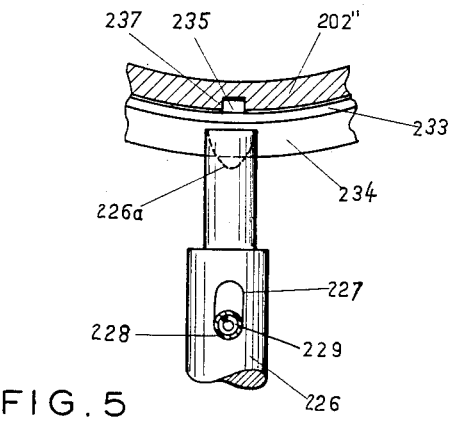
FIG. 5 is a cross-sectional view taken substantially on the line V—V of FIG. 4.

The systems of FIGS. 4 and 5 comprise a housing 201 with a control sleeve 202, the latter having a flange 202' with gear teeth 223 which in the position of FIG. 4 mate with gear teeth 224 on an actuating knob 225. This knob has a stem 226 to which it is fastened by a screw 240 and which is formed with an oblong transverse bore 277 traversed by a tubular stud 228. A compression spring 229 in stud 228 bears upon two balls 230, 230' adapted to enter either of two annular grooves 231, 232 in knob 225; in the position of FIG. 4, which corresponds to manual control, the balls 230, 230' are received in the lower groove 231.

Stem 226 has a beveled end 226a in camming engagement with a frustoconical surface 234 on a coupling ring 233. This ring has a radially inwardly projecting lug 235 which is receivable in a peripheral slot 237 of an annular shoulder 202'' of sleeve 202, the latter together with another flange 202''' defining a clearance for the driven gear 207 which is formed with a beveled surface 207b facing a similar surface 236 of ring 233. In the manual position of knob 225 shown in FIG. 4, in which the gear teeth 223 mate with the gear teeth 224, ring 233 is cammed out of contact with gear 207 by the beveled edge 226a of stem 226; at the same time the lug 235 is freed from the slot 237 so that sleeve 202 can rotate under the control of knob 225 even though ring 233 may be frictionally held against rotation by its engagement with the beveled edge 226a. A helical compression spring 238, anchored to lug 235, is deformed under these circumstances in both an axial and a torsional sense.

When it is desired to switch to automatic operation, knob 225 is radially withdrawn in a downward direction whereby the ball checks 230, 230' come to rest in the upper groove 232 thereof. Gear teeth 224 of knob 225 are now disengaged from gear teeth 223 of sleve 202 while the beveled edge 226a of stem 226 releases the camming surface 234 of ring 233; spring 238 is thus enabled to rotate the ring 233 back into proper alignment of its lug 235 with slot groove 237 and thereupon to drive this lug into the slot, thereby also establishing frictional contact between surfaces 236 and 207b so that the members 207, 233 and 202 rotate in unison under the control of a motor not shown in this embodiment. Naturally, the lug 235 and the slot 237 are representative of a wide variety of coacting formations for positively or otherwise coupling the sleeve 202 with the ring 233 while the latter engages the gear 207.

Although my invention has been disclosed with specific reference to certain embodiments particularly described and illustrated, it is to be understood that modifications of the arrangement shown, as well as combinations of compatible features from different figures, are possible and believed to be readily apparent to persons skilled in the art without departing from the spirit and scope of the appended claims.

I claim:

1. In a camera objective having a housing and at least one optical component axially displaceable in said housing, in combination, automatic drive means for said component, control means in engagement with said component, a manually movable member shiftable on said housing between a set of first positions and an alternate second position, said member engaging said control means in any of said first positions for displacing said component upon movement along a path defined by said first positions, and coupling means controlled by said member operatively connecting said drive means with said control means for automatic displacement of said component upon a shifting of said member into said alternate position in which said member is disengaged from said control means.

2. In a camera objective having a generally cylindrical housing and at least one optical component axially displaceable in said housing, in combination, automatic drive means for said component, a rotatable sleeve in said housing having a camming formation in engagement with said component, a manually movable member shiftable on said housing between a set of first positions and an alternate second position, said member engaging said sleeve in any of said first positions for displacing said component upon movement along a path defined by said first positions, and coupling means controlled by said member operatively connecting said drive means with said sleeve for automatic displacement of said component upon a shifting of said member into said alternate position in which said member is disengaged from said sleeve.

3. In a camera objective having a housing and at least one optical component axially displaceable in said housing, in combination, automatic drive means for said component, control means in engagement with said component, a manually movable member rotatable on said housing through an orbit defined by a set of first positions and shiftable out of said orbit into an alternate second position, said member engaging said control means in any of said first positions for displacing said component upon rotation along said orbit, and coupling means controlled by said member operatively connecting said drive means with said control means for automatic displacement of said component upon a shifting of said member into said alternate position in which said member is disengaged from said control means.

4. In a camera objective having a housing and at least one optical component axially displaceable in said housing, in combination, automatic drive means for said component, control means in engagement with said component, a manually movable member shiftable on said housing between a set of first positions and an alternate second position, said member engaging said control means in any of said first positions for displacing said component upon movement along a path defined by said first positions, and coupling means spring-urged into establishment of an operative connection between said drive means and said control means for automatic displacement of said component upon a shifting of said member into said alternate position in which said member is disengaged from said control means, said member upon re-engaging said control means overcoming the spring force of said coupling means for breaking said connection.

5. In a camera objective having a generally cylindrical housing and at least one optical component axially displaceable in said housing, in combination, automatic drive means for said component, a rotatable sleeve in said housing having a camming formation in engagement with said component, a manually movable member rotatable on said housing through an orbit defined by a set of first positions and shiftable out of said orbit into an alternate second position, said member engaging said sleeve in any of said first positions for displacing said component upon rotation along said orbit, and coupling means controlled by said member operatively connecting said drive means with said sleeve for automatic displacement of said component upon a shifting of said member into said alternate position in which said member is disengaged from said sleeve.

6. In a camera objective having a generally cylindrical housing and at least one optical component axially displaceable in said housing, in combination, automatic drive means for said component, a rotatable sleeve in said housing having a camming formation in engagement with said component, a manually movable member shiftable on said housing between a set of first positions and an alternate second position, said member engaging said sleeve in any of said first positions for displacing said component upon movement along a path defined by said first positions, and coupling means spring-urged into establishment of an operative connection between said drive means and said sleeve for automatic displacement of said component upon a shifting of said member into said alternate position in which said member is disengaged from said sleeve, said member upon re-engaging said sleeve overcoming the spring force of said coupling means for breaking said connection.

7. In a camera objective having a housing and at least one optical component axially displaceable in said housing, in combination, automatic drive means for said component, control means in engagement with said component, a manually movable member rotatable on said housing through an orbit defined by a set of first positions and shiftable out of said orbit into an alternate second position, said member engaging said control means in any of said first positions for displacing said component upon rotation along said orbit, and coupling means spring-urged into establishment of an operative connection between said drive means and said control means for automatic displacement of said component upon a shifting of said member into said alternate position in which said member is disengaged from said control means, said member upon reengaging said control means overcoming the spring force of said coupling means for breaking said connection.

8. In a camera objective having a generally cylindrical housing and at least one optical component axially displaceable in said housing, in combination, automatic drive means for said component, a rotatable sleeve in said housing having a camming formation in engagement with said component, a manually movable member rotatable on said housing through an orbit defined by a set of first positions and shiftable out of said orbit into an alternate second position, said member engaging said sleeve in any of said first positions for displacing said component upon rotation along said orbit, and coupling means spring-urged into establishment of an operative connection between said drive means and said sleeve for automatic displacement of said component upon a shifting of said member into said alternate position in which said member is disengaged from said sleeve, said member upon re-engaging said sleeve overcoming the spring force of said coupling means for breaking said connection.

9. The combination according to claim 8, further comprising indexing means for releasably retaining said member alternately in said orbit and in said second position.

10. The combination according to claim 8 wherein said drive means comprises a gear coaxial with said sleeve, said coupling means including a resilient link extending in generally axial direction from said sleeve toward said gear for selective engagement thereof.

11. The combination according to claim 10 wherein said member comprises a handle rotatable about the axis of said sleeve and said gear, said housing being provided with a ring rotatable thereon and connected with said handle.

12. The combination according to claim 11 wherein said handle is axially shiftable along with said ring between a first plane relatively close to said gear and a second plane relatively remote from said gear, said ring having means coupling it to said gear in said first plane while leaving said gear free to rotate upon said handle returning to said second plane, said ring being further provided with camming means for disengaging said resilient link from said gear upon its displacement into said first plane.

13. The combination according to claim 12, further comprising co-operating formations on said ring and said housing for locking said handle against rotation in said second plane.

14. The combination according to claim 10 wherein said member comprises a handle which is radially shiftable relatively to said housing into and out of said orbit, said handle upon its displacement into said orbit bearing upon said resilient link for disengaging it from said gear while concurrently establishing a connection between said handle and said sleeve.

15. The combination according to claim 14, further comprising spring means on said housing bearing radially upon said handle for urging it into said orbit, said handle and said housing being provided with co-operating formations for maintaining said handle radially withdrawn from said orbit against the force of said spring means.

16. The combination according to claim 8 wherein said drive means comprises a gear coaxial with said sleeve, said coupling means including an axially slidable ring concentric with said sleeve and spring-urged into contact with said gear with concurrent engagement of said sleeve.

17. The combination according to claim 16 wherein said member comprises a knob rotatable in a plane parallel to the axis of said sleeve and radially shiftable out of said plane, said knob and said sleeve having co-operating gear teeth for turning said sleeve by a rotation of said knob in said plane, said knob being further provided with cam means for withdrawing said ring from contact with said gear upon displacement of said knob into said plane, said knob upon radial shift out of said plane disengaging its gear teeth from those of said sleeve.

References Cited in the file of this patent
UNITED STATES PATENTS
1,950,166    Durholz _____ Mar. 6, 1934